(12) United States Patent
Fabre et al.

(10) Patent No.: US 10,029,827 B2
(45) Date of Patent: Jul. 24, 2018

(54) MEMBRANE TYPE STOPPER

(71) Applicant: Airbus Operations S.A.S., Toulouse (FR)

(72) Inventors: Christian Fabre, Tournefeuille (FR); Alain Bignolais, Leguevin (FR)

(73) Assignee: Airbus Operations S.A.S. (FR)

( * ) Notice: Subject to any disclaimer, the term of this patent is extended or adjusted under 35 U.S.C. 154(b) by 369 days.

(21) Appl. No.: 14/870,130

(22) Filed: Sep. 30, 2015

(65) Prior Publication Data

US 2016/0101906 A1    Apr. 14, 2016

(30) Foreign Application Priority Data

Oct. 10, 2014  (FR) ..................................... 14 59744

(51) Int. Cl.
  *B65D 39/00* (2006.01)
  *F16K 17/16* (2006.01)
  (Continued)

(52) U.S. Cl.
  CPC .......... *B65D 39/0052* (2013.01); *A62C 35/08* (2013.01); *F16K 17/16* (2013.01);
  (Continued)

(58) Field of Classification Search
  CPC ............ B65D 39/0052; B65D 39/0023; B65D 39/00; B65D 39/0029; B65D 39/0041; B65D 39/007; B65D 39/0076; B65D 39/0088; B65D 39/04; B65D 39/12; B65D 41/58; B65D 41/60; B65D 49/08;
  (Continued)

(56) References Cited

U.S. PATENT DOCUMENTS 796,141 A * 8/1905 Mueller ................. B65D 39/04
                                                 217/110
3,498,537 A * 3/1970 Wong .................... G05D 23/022
                                                 137/73

(Continued)

FOREIGN PATENT DOCUMENTS

DE    12 61 365 B    2/1968
FR    2 453 343 A1   10/1980
GB    1 189 186 A    4/1970

OTHER PUBLICATIONS

FR Search Report (FR 14 59744) dated Jun. 1, 2015.

*Primary Examiner* — Anthony Stashick
*Assistant Examiner* — Robert Poon
(74) *Attorney, Agent, or Firm* — Lerner, David, Littenberg, Krumholz & Mentlik, LLP

(57) ABSTRACT

A stopper for a tank having an opening includes a body which is provided to be fixed in the opening and which has a hole, a membrane which is fixed to the body and of which a portion completely blocks the hole, a core which is fixed to the portion of the membrane which blocks the hole, and stop means which are provided to permit a movement of the core between a blocking position which corresponds to the non-broken membrane which blocks the hole, and an open position which corresponds to the broken membrane which is spaced apart from the hole, and to keep the core fixedly joined to the body in an open position. The knowledge of the characteristics of the membrane enables the force from which the stopper opens to be known.

8 Claims, 3 Drawing Sheets

(51) Int. Cl.
*A62C 35/08* (2006.01)
*A62C 3/08* (2006.01)
*A62C 13/22* (2006.01)

(52) U.S. Cl.
CPC ............... *A62C 3/08* (2013.01); *A62C 13/22* (2013.01); *B65D 2539/006* (2013.01)

(58) Field of Classification Search
CPC ........ F16K 17/16; F16K 17/14; F16K 17/164; F16K 17/40; F16K 17/403; F16K 17/406
See application file for complete search history.

(56) References Cited

U.S. PATENT DOCUMENTS

| | | | | |
|---|---|---|---|---|
| 3,872,874 A | * | 3/1975 | Nedelec | F16K 17/1626 137/68.25 |
| 4,064,889 A | * | 12/1977 | Gayle | F16K 17/366 137/539 |
| 4,245,749 A | * | 1/1981 | Graves | F16K 17/16 116/276 |
| 5,452,852 A | * | 9/1995 | Marckel | F01P 11/16 137/75 |
| 6,431,196 B1 | * | 8/2002 | Brazier | F16K 17/16 137/15.01 |
| 7,950,409 B2 | * | 5/2011 | Stokes | E21B 34/063 137/68.12 |
| 2010/0282331 A1 | * | 11/2010 | Newman | F16K 17/16 137/68.19 |
| 2012/0279940 A1 | * | 11/2012 | Giovannini | B65D 39/0052 215/329 |

* cited by examiner

MEMBRANE TYPE STOPPER

FIELD OF THE INVENTION

The present invention relates to a tank stopper, and a tank comprising such a stopper.

BACKGROUND OF THE INVENTION

Some aircraft comprise tanks which contain fluids, such as, for example, a tank which contains an extinguishing agent. This tank has an opening which is provided with a cap which is pierced by a pyrotechnical means when it is desirable to empty the tank.

The breakage of this cap brings about debris which is capable of being discharged at the same time as the agent contained in the tank. It is therefore necessary to install a retention filter in order to retain this debris.

Furthermore, once open, it is not possible to isolate the tank from any potential return of agent via the discharge pipe and, if it is desirable to prevent this phenomenon of fluid return, it is advantageous to add downstream in the discharge circuit an additional device, such as a non-return valve.

Although such a system having a cap operates correctly, it is difficult to control the force from which the flap opens.

BRIEF SUMMARY OF THE INVENTION

An aspect of the present invention may provide a stopper which does not have the disadvantages of the prior art and which in particular enables adjustment and precise knowledge of the pressure from which the stopper opens.

Another aspect of the invention may provide a tank stopper which also acts as a safety cap, thus preventing any damage to the tank if the pressure inside the tank should increase for one reason or another and permitting, without the addition of supplementary devices, the opening of the tank and the discharge thereof without generating debris.

Another aspect of the invention may provide a tank stopper which also acts as a non-return valve.

To this end, there is proposed a stopper for a tank comprising an opening, the stopper comprising:
- a body which is provided to be fixed in the opening and which has a hole, and wherein it further comprises
- a membrane which is fixed to the body and of which a portion completely blocks the hole,
- a core which is fixed to the portion of the membrane which blocks the hole, and
- core stopper which is provided to permit a movement of the core between a blocking position which corresponds to the non-broken membrane which blocks the hole, and an open position which corresponds to the broken membrane which is spaced apart from the hole, and to keep the core fixedly joined to the body in an open position.

In accordance with the features of the membrane, it is thus possible to know the force and therefore the pressure from which the stopper opens.

Advantageously, the core stopper is constituted by at least one arm and, for the or each arm, an aperture which the body has, and one of the ends of the or each arm is fixedly joined to the core and the other end of the arm is inserted into the aperture.

Advantageously, the core corresponds to the shape of the hole.

Advantageously, the body has a seat, the core has an edge and the body has core return which urge the core into an abutment position in which the edge is in abutment with the seat.

Advantageously, the core return comprise an annular member and a compression spring, the annular member can be moved parallel with the movement direction of the core and is in abutment with the ends of the arms which are inserted into the apertures and the spring is placed between a fixed portion of the body and the annular member.

Advantageously, the core comprises a first portion which carries the edge and which is fixed to the face of the membrane which is intended to be orientated toward the inner side of the tank, and a second portion which carries the arms and which is fixed to the face of the membrane which is intended to be orientated toward the outer side of the tank.

Advantageously, the body comprises:
- a first ring which comprises a first annular member and a first disc which extends toward the inner side of the first annular member and which is recessed at the center and which forms the seat,
- a second ring which comprises a second annular member and a second disc which extends toward the inner side of the second annular member and which is recessed at the center and
- pressing means which are provided to keep the first disc and the second disc pressed against each other, and the membrane is sandwiched between, on the one hand, the first disc which is in contact with the face of the membrane which is intended to be orientated toward the inner side of the tank and, on the other hand, the second disc which is in contact with the face of the membrane which is intended to be orientated toward the outer side of the tank.

Advantageously, the pressing means are constituted by a counter-nut which comprises an annular counter-member which is provided to be screwed against the inner surface of the first annular member and one end of which is provided to be in abutment against the second disc.

The invention also proposes a tank which comprises an opening and a stopper according to one of the preceding variants, whose body is fixed in the opening.

BRIEF DESCRIPTION OF THE DRAWINGS

The features of the invention mentioned above and others will be appreciated more clearly from a reading of the following description of an embodiment, the description being given with reference to the appended drawings, in which.

DETAILED DESCRIPTION

Figure 1:
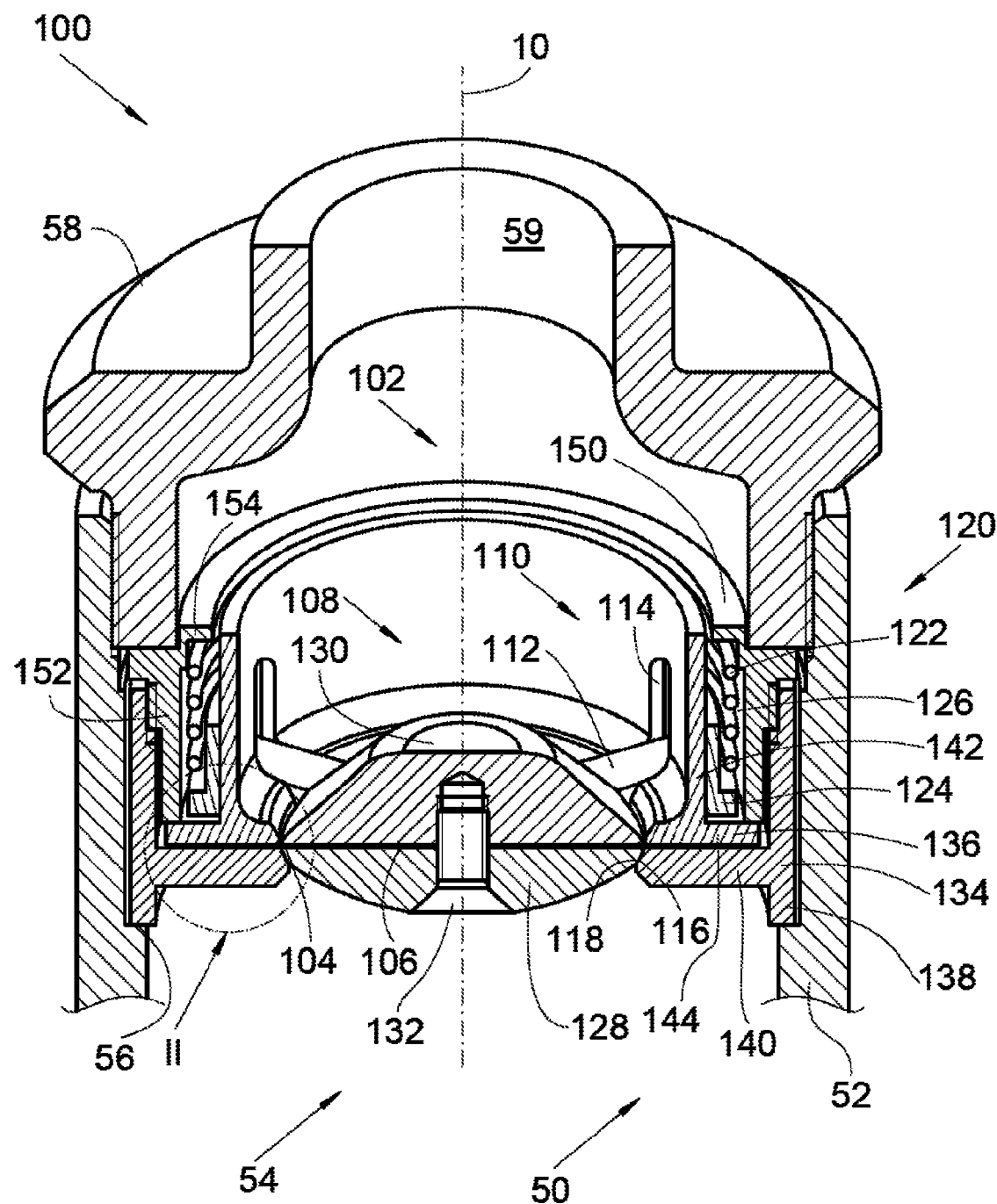
FIG. 1 is a sectioned view of a stopper according to the invention in a closed position.

FIG. 1 shows a stopper 100 which is positioned in a tank 50 which comprises in this instance a neck 52 which has an axial direction 10 and through which an opening 54 extends.

In the embodiment of the invention set out here, the stopper 100 is in this instance held in place in the neck 52 by an abutment of the stopper 100 against a recess 56 which is formed inside the neck 52 and by a nut 58 through which a channel 59 extends and which is screwed inside the neck 52. The stopper 100 is thus sandwiched between the recess 56 and the nut 58.

The stopper 100 is generally formed by means of revolution about the axial direction 10. The stopper 100 comprises:

- a body 102 which is fixed in the opening 54, in this instance by the recess 56 and the nut 58, and which has a hole 104 which extends through the body 102 and which is arranged opposite the opening 54 and which is provided to allow the inner side and the outer side of the tank 50 to be connected,
- a membrane 106 which is fixed to the body 102 and of which a portion completely blocks the hole 104,
- a core 108 which is fixed to the portion of the membrane 106 which blocks the hole 104, and
- core stopper 110 which is provided to permit a movement of the core 108 between a blocking position which corresponds to the non-broken membrane 106 which blocks the hole 104, and an open position which corresponds to the broken membrane 106 and which is spaced apart from the hole 104 in order to enable the passage of the fluid and to keep the core 108 fixedly joined to the body 102 in the open position.

In this manner, when excess pressure is created in the tank 50, the excess pressure acts on the membrane 106 in the region of the hole 104 and, when the excess pressure exceeds the resistance force of the membrane 106, it breaks instantaneously which allows the fluid which is contained in the tank 50 to be released and to be discharged via the hole 104 and the channel 59.

In order to prevent debris from the membrane 106 which has been broken in this manner from being carried with the fluid, the portion of the membrane 106 which blocks the hole 104 is fixedly joined to the core 108 which is itself stopped by the core stopper 110.

Figure 2:
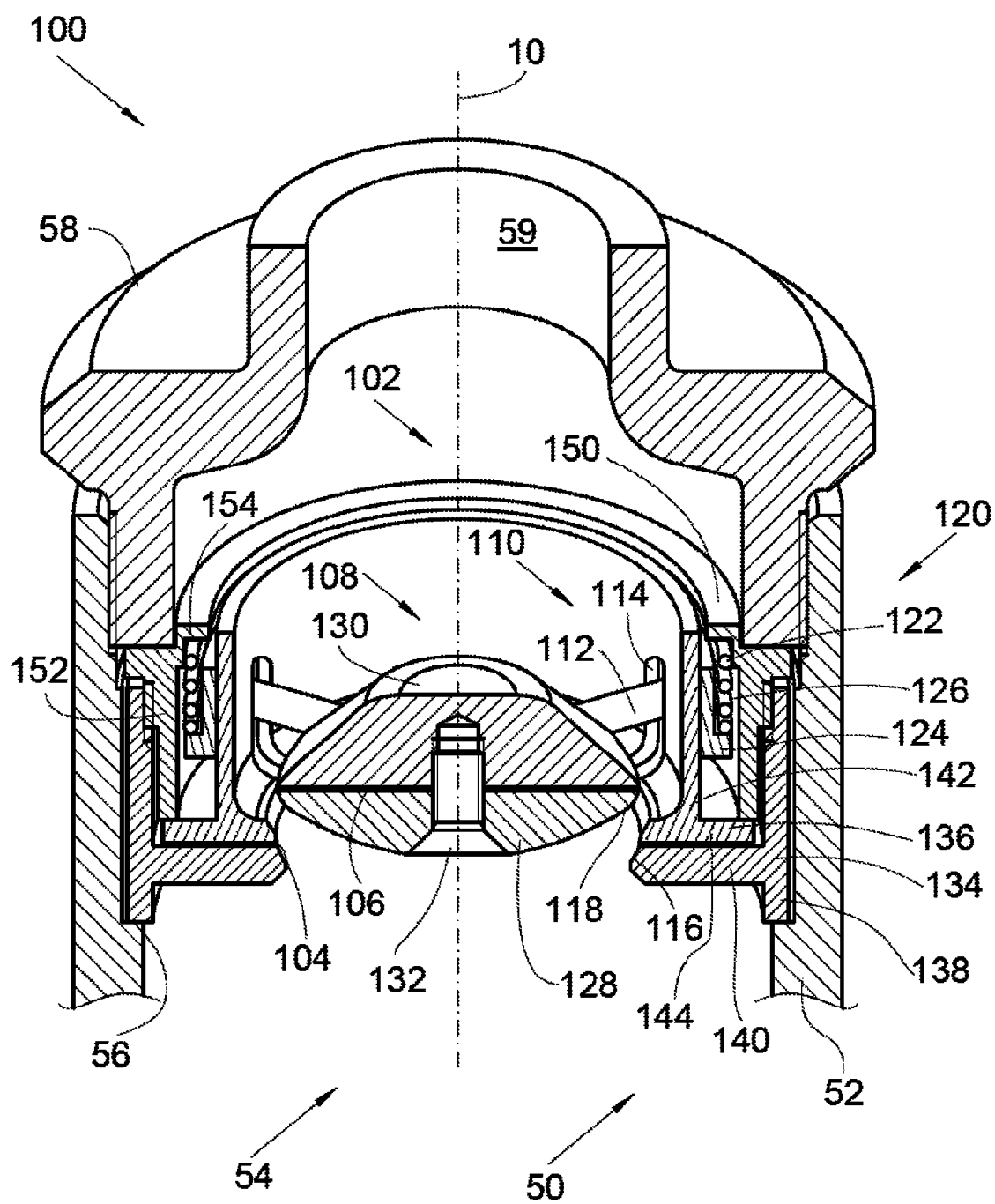
FIG. 2 is a sectioned view of the stopper of FIG. 1 in an open position.
Figure 3:
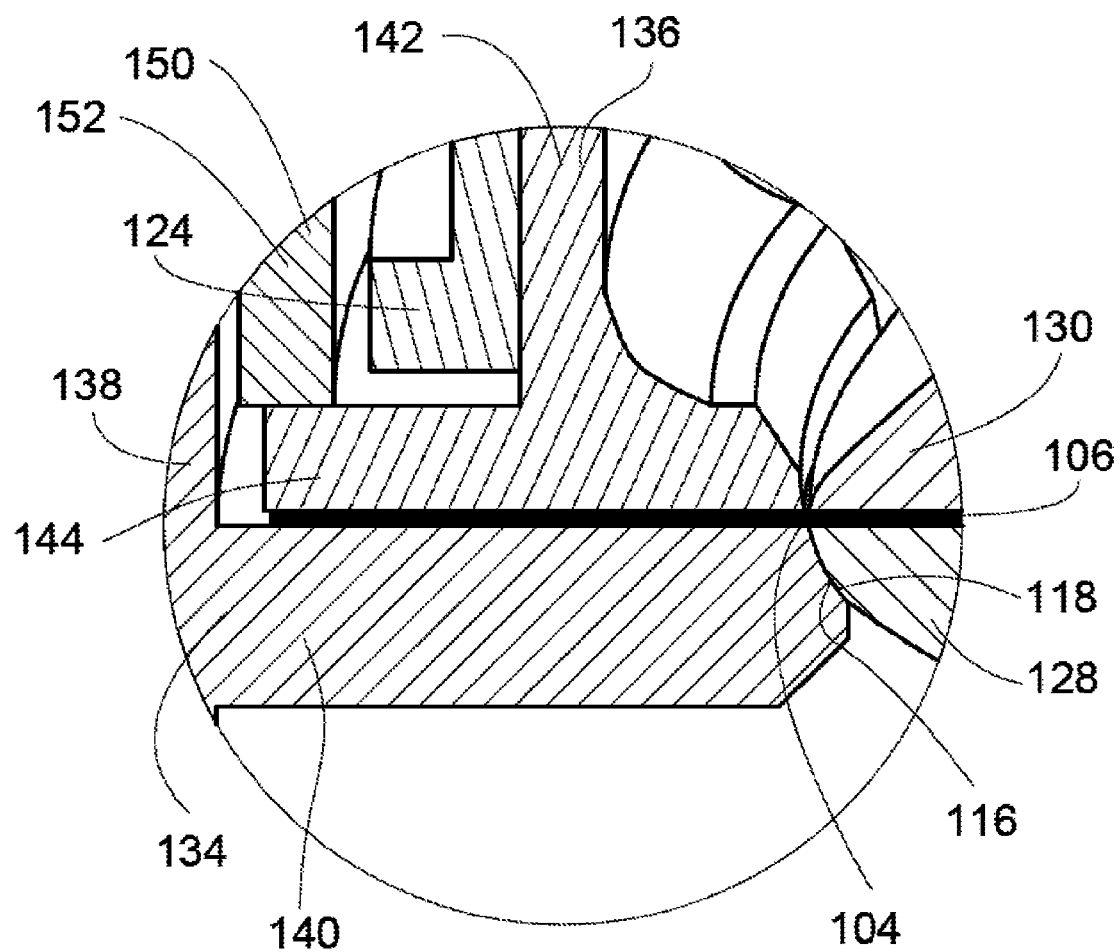
FIG. 3 is an enlarged view of the detail II of FIG. 1.

FIG. 2 shows the stopper 100 when the membrane 106 is broken and the core 108 is stopped by the core stopper 110 in an open position.

The movement of the core 108 corresponds in this instance to a translation parallel with the axial direction 10, that is to say, perpendicular to the plane of the hole 104 and directed from the inner side toward the outer side of the tank 50.

The breaking force of the membrane 106 which is in this instance a pure shearing force can be correctly determined in accordance with the material used, from the thickness thereof and the sizes of the hole 104. In this manner, the excess pressure from which the stopper 100 will open is correctly known.

In order to facilitate a clean break of the membrane 106, it is produced from a rigid material, more specifically of metal, such as, for example, stainless steel or brass.

The core stopper 110 is constituted in this instance by at least one arm 112 and, for the or each arm 112, an aperture 114 which the body 102 has. The arrangement of each arm 112 is such that one of the ends of the arm 112 is fixedly joined to the core 108 and the other end of the arm 112 is inserted into the associated aperture 114. The aperture 114 has an appropriate shape to permit the movement of the arm 112 between the blocking position and the open position. Each aperture 114 is in this instance in the form of an oblong hole whose long axis is parallel with the movement direction of the core 108.

There are in this instance three arms 112 which are distributed in a regular manner around the core 108.

In order to enable regular breaking of the membrane 106 over the perimeter of the hole 104, the core 108 corresponds to the shape of the hole 104. In this manner, the membrane 106 will break in a regular manner along the periphery of the core 108.

In this last embodiment, in order to produce a sealed contact between the body 102 and the core 108 after the membrane 106 has been broken, the body 102 has a seat 116 and the core 108 has an edge 118 whose shape is adapted to that of the seat 116 in such a manner that, when the edge 118 is in abutment against the seat 116, the sealed contact is produced.

The body 102 further has core return 120 which urges the core 108 into an abutment position in which the edge 118 is in abutment against the seat 116; the abutment position corresponds substantially to the blocking position. The core means 120 generates a return force and the total of the return force and the resistance force of the membrane 106 has to be less than the force created by the excess pressure in order to allow the breakage of the membrane 106 and the opening of the stopper 100.

In this manner, after breakage of the membrane 106 and discharge of the tank fluid 50, the core return 120 repels the core 108 toward the abutment position, which prevents a fluid from another tank which is mounted on the same distribution network from being introduced into the tank 50 after the stopper 100 has been opened.

In the embodiment of the invention set out here, the core return 120 comprises a compression spring 122 and an annular member 124. The annular member 124 is arranged inside a housing 126 of the body 102 and it is movable in a manner parallel with the movement direction of the core 108. The annular member 124 is in abutment against the ends of the arms 112 which are inserted into the body 102 and the spring 122 is placed in the housing 126 between a fixed portion of the body 102 and the annular member 124. The annular member 124 is arranged against the arms 112 in order to repel them into a blocking position.

After the membrane 106 has been broken and in order to be able to recover the core 108 and fix it to a new membrane 106, the core 108 can advantageously be disassembled. The core 108 comprises a first portion 128 which carries the edge 118 and which is fixed to the face of the membrane 106 which is orientated toward the inner side of the tank 50, and a second portion 130 which carries the arms 112 and which is fixed to the face of the membrane 106 which is orientated toward the outer side of the tank 50.

The fixing of the first portion 128 and the second portion 130 is ensured in this instance by a clamping screw 132 whose head is in abutment against the first portion 128 and which is screwed into the second portion 130 passing through the membrane 106.

The fixing of the membrane 106 to the body 102 may be carried out using any appropriate means; in accordance with the materials used, it is thus possible for the membrane 106 to be welded to the body 102.

In the embodiment of the invention set out here, the body 102 comprises a first ring 134 and a second ring 136 and the membrane 106 is sandwiched between the first ring 134 and the second ring 136.

The first ring 134 comprises a first annular member 138 which is in abutment against the recess 56 and a first disc 140 which extends toward the inner side of the first annular member 138 and which is recessed in the center and forms the seat 116.

The second ring 136 comprises a second annular member 142 and a second disc 144 which extends toward the inner side of the second annular member 142 and which is recessed in the center in order to enable the passage of the core 108.

The membrane 106 is sandwiched between the first disc 140 and the second disc 144 which are held in a state pressed against each other by pressing means 150 of the body 102.

The first disc 140 and the second disc 144 are arranged so that the first disc 140 is in contact with the face of the membrane 106 which is orientated toward the inner side of the tank 50 and the second disc 144 is in contact with the face of the membrane 106 which is orientated toward the outer side of the tank 50.

The housing 126 is in this instance produced between the first annular member 138 and the second annular member 142.

The pressing means 150 are produced in this instance by means of a counter-nut 150 which comprises an annular counter-member 152 which is provided to be screwed against the inner surface of the first annular member 138 and one end of which is provided to move into abutment with the second disc 144 in order to press it against the first disc 140.

The fixed portion of the body 102 against which the spring 122 is in abutment is in this instance a counter-disc 154 which extends toward the inner side of the counter-ring 152.

Such an arrangement enables, after opening the stopper 100, the disassembly of the broken membrane 106 which remains between the first disc 140 and the second disc 144 and the replacement thereof with a new membrane 106.

According to another embodiment of the invention, the membrane 106 is fixed to the first disc 140 and to the second disc 144, for example, by means of laser welding or electron beam welding.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A stopper for a tank comprising an opening, the stopper comprising:
   a body configured to be fixed in the opening and having a hole, wherein the body further comprises:
      a membrane fixed to the body and having a first surface and a second surface opposite the first surface, the membrane having a non-broken state in which a portion of the membrane completely blocks the hole and a broken state in which the portion is separated from rest of the membrane fixed to the body, thereby unblocking the hole;
      a core fixed to the portion of the membrane on the first surface and the second surface, and
      a core stopper configured to permit a movement of the core between a blocking position which corresponds to the non-broken state of the membrane, and an open position which corresponds to the broken state of the membrane with the portion spaced apart from the hole, and to keep the core fixedly joined to the body in an open position,
   wherein the core stopper comprises at least one arm and, for the at least one arm, an aperture in the body, and
   wherein one end of the at least one arm is fixedly joined to the core and another end of the at least one arm is inserted into the aperture.

2. The stopper as claimed in claim 1, wherein the core corresponds to the shape of the hole.

3. The stopper as claimed in claim 2, wherein the body has a seat, wherein the core has an edge and wherein the body has a core return configured to urge the core into an abutment position in which the edge is in abutment with the seat.

4. The stopper as claimed in claim 3, wherein the core return comprises an annular member and a compression spring, wherein the annular member is configured to be moved parallel with the movement direction of the core and is in abutment with the ends of the at least one arm which is inserted into the apertures and wherein the spring is placed between a fixed portion of the body and the annular member.

5. The stopper as claimed in claim 3, wherein the core comprises a first portion carrying the edge and fixed to the face of the membrane configured to be orientated toward the inner side of the tank, and a second portion carrying the at least one arm and fixed to the face of the membrane configured to be orientated toward the outer side of the tank.

6. The stopper as claimed in claim 3, wherein the body comprises:
   a first ring comprising a first annular member and a first disc extending toward the inner side of the first annular member, and recessed at the center and forming the seat,
   a second ring comprising a second annular member and a second disc extending toward the inner side of the second annular member and recessed at the center, and
   pressing means to keep the first disc and the second disc pressed against each other, and
   wherein the membrane is sandwiched between the first disc in contact with the face of the membrane configured to be orientated toward the inner side of the tank and the second disc in contact with the face of the membrane configured to be orientated toward the outer side of the tank.

7. The stopper as claimed in claim 6, wherein the pressing means comprises a counter-nut comprising an annular counter-member configured to be screwed against the inner surface of the first annular member and one end of which is configured to be in abutment against the second disc.

8. A tank comprising an opening and a stopper comprising:
   a body configured to be fixed in the opening and having a hole, wherein the body further comprises:
      a membrane fixed to the body and having a first surface and a second surface opposite the first surface, the membrane having a non-broken state in which a portion of the membrane completely blocks the hole and a broken state in which the portion is separated from rest of the membrane fixed to the body, thereby unblocking the hole;
      a core fixed to the portion of the membrane on the first surface and the second surface, and
      a core stopper configured to permit a movement of the core between a blocking position which corresponds to the non-broken state of the membrane, and an open position which corresponds to the broken state of the membrane with the portion spaced apart from the hole, and to keep the core fixedly joined to the body in an open position, wherein the core stopper comprises at least one arm and, for the at least one arm, an aperture in the body, and wherein one end of the at least one arm is fixedly joined to the core and another end of the at least one arm is inserted into the aperture, wherein the body is fixed in the opening.

\* \* \* \* \*